United States Patent
Takabayashi et al.

(10) Patent No.: US 9,505,309 B2
(45) Date of Patent: Nov. 29, 2016

(54) ELECTRIC VEHICLE CONTROL DEVICE AND BRAKE CONTROLLING METHOD FOR ELECTRIC VEHICLE

(71) Applicants: Hirokazu Takabayashi, Tokyo (JP); Yukio Nakashima, Tokyo (JP)

(72) Inventors: Hirokazu Takabayashi, Tokyo (JP); Yukio Nakashima, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/779,529

(22) PCT Filed: Mar. 29, 2013

(86) PCT No.: PCT/JP2013/059699
§ 371 (c)(1),
(2) Date: Sep. 23, 2015

(87) PCT Pub. No.: WO2014/155720
PCT Pub. Date: Oct. 2, 2014

(65) Prior Publication Data
US 2016/0052399 A1    Feb. 25, 2016

(51) Int. Cl.
*B60L 7/18* (2006.01)
*B60L 7/26* (2006.01)
(Continued)

(52) U.S. Cl.
CPC .. *B60L 7/26* (2013.01); *B60L 7/14* (2013.01); *B60L 7/24* (2013.01); *B60T 1/10* (2013.01); *B60T 8/17* (2013.01); *F16D 61/00* (2013.01);
(Continued)

(58) Field of Classification Search
CPC .................................. B60K 1/02; B60L 3/06
See application file for complete search history.

(56) References Cited

U.S. PATENT DOCUMENTS 5,839,800 A    11/1998  Koga et al.
5,892,437 A *   4/1999  Scheibe ................ B60T 17/221
                                                340/438

(Continued)

FOREIGN PATENT DOCUMENTS

GB    2460528 A    12/2009
JP   7-250401 A     9/1995
(Continued)

OTHER PUBLICATIONS

International Search Report (PCT/ISA/210) mailed on Jul. 2, 2013, by the Japanese Patent Office as the International Searching Authority for International Application No. PCT/JP2013/059699.
(Continued)

*Primary Examiner* — Thomas Tarcza
*Assistant Examiner* — Alex C Dunn
(74) *Attorney, Agent, or Firm* — Buchanan Ingersoll & Rooney PC (57) ABSTRACT

An electric vehicle control device includes a calculation unit that calculates a regenerative-brake-torque load factor when a braking command is detected. The calculation unit includes a brake-torque load-factor determination unit that determines the regenerative-brake-torque load factor according to vehicle speed information that is a detection value of vehicle speed; and a brake-torque load-factor correction unit that corrects the regenerative-brake-torque load factor determined by the brake-torque load-factor determination unit using element temperature information that is temperature information of a switching element included in an inverter.

6 Claims, 7 Drawing Sheets (51) Int. Cl.
  *B60L 7/14* (2006.01)
  *B60T 1/10* (2006.01)
  *F16D 61/00* (2006.01)
  *B60T 8/17* (2006.01)
  *B60L 7/24* (2006.01)

(52) U.S. Cl.
  CPC ......... *B60L 2200/26* (2013.01); *B60L 2210/30* (2013.01); *B60L 2210/40* (2013.01); *B60L 2240/12* (2013.01); *B60L 2240/525* (2013.01); *B60L 2240/662* (2013.01); *B60T 2270/604* (2013.01); *Y02T 10/7241* (2013.01); *Y02T 10/7291* (2013.01); *Y02T 90/16* (2013.01)

(56) References Cited

U.S. PATENT DOCUMENTS

| | | | |
|---|---|---|---|
| 5,895,100 A | 4/1999 | Ito et al. | |
| 6,984,946 B2 * | 1/2006 | Donnelly | B60L 3/102 105/61 |
| 7,238,139 B2 * | 7/2007 | Roethler | F16H 37/086 475/216 |
| 7,518,254 B2 * | 4/2009 | Donnelly | B60L 7/06 290/1 A |
| 7,739,016 B2 * | 6/2010 | Morris | B60K 6/365 303/112 |
| 7,906,862 B2 * | 3/2011 | Donnelly | B60L 7/06 290/40 C |
| 8,050,821 B2 * | 11/2011 | Morris | B60K 6/445 280/5.519 |
| 8,070,647 B2 * | 12/2011 | Heap | B60K 6/445 477/3 |
| 8,135,519 B2 * | 3/2012 | Heap | B60K 6/365 701/51 |
| 8,140,230 B2 * | 3/2012 | Haggerty | B60K 6/445 123/192.1 |
| 8,296,032 B2 * | 10/2012 | Wang | B60K 6/445 701/51 |
| 8,392,057 B2 * | 3/2013 | Wright | B60L 11/005 701/31.7 |
| 2006/0005736 A1 * | 1/2006 | Kumar | B60L 11/1801 105/1.4 |
| 2012/0063187 A1 | 3/2012 | Sato et al. | |
| 2012/0138395 A1 * | 6/2012 | Curtis | B60L 7/26 188/159 |
| 2012/0139328 A1 * | 6/2012 | Brown | B60L 7/18 303/3 |
| 2012/0139329 A1 * | 6/2012 | Fabini | B60L 7/10 303/3 |

FOREIGN PATENT DOCUMENTS

| | | |
|---|---|---|
| JP | 08-163707 A | 6/1996 |
| JP | 9-215107 A | 8/1997 |
| JP | 10-271608 A | 10/1998 |
| JP | 11-69504 A | 3/1999 |
| JP | 2001-97204 A | 4/2001 |
| JP | 2004-236397 | 8/2004 |
| JP | 2005-261113 A | 9/2005 |
| JP | 2008-201391 A | 9/2008 |
| JP | 2009-296733 A | 12/2009 |

OTHER PUBLICATIONS

Written Opinion (PCT/ISA/237) mailed on Jul. 2, 2013, by the Japanese Patent Office as the International Searching Authority for International Application No. PCT/JP2013/059699.
Japanese Office Action dated Apr. 12, 2016 issued in corresponding Japanese Patent Appln. 2015-507904, with English translation.
German Office Action dated Jun. 1, 2016, issued in corresponding German Patent Appln. No. 112013006897.4, with English translation (10 pages).

* cited by examiner

ELECTRIC VEHICLE CONTROL DEVICE AND BRAKE CONTROLLING METHOD FOR ELECTRIC VEHICLE

FIELD

The present invention relates to an electric vehicle control device and a brake controlling method for an electric vehicle that simultaneously uses an air brake and a regenerative brake.

BACKGROUND

In the power-converter controller for a vehicle disclosed in Patent Literature 1 listed below, it is conventional to increase the regenerative brake operation range in the high-speed range by additionally providing a chopper device and a chopper control device.

CITATION LIST

Patent Literature

Patent Literature 1: Japanese Patent Application Laid-open No. 2004-236397

SUMMARY

Technical Problem

With the above conventional technique, because it is necessary to additionally provide a chopper device and a chopper control device, there is a problem in that the size of the device is enlarged.

The present invention has been achieved in view of the above problem, and an objective of the present invention is to provide an electric vehicle control device that can increase a regenerative brake operation range in the high-speed range without providing additional devices such as a chopper device and a chopper control device and to provide a brake controlling method for an electric vehicle.

Solution to Problem

To solve the problem and achieve the objective mentioned above, the present invention relates to an electric vehicle control device that includes an inverter that drives a motor; a calculation unit that calculates a regenerative-brake-torque load factor when a braking command is detected; and an element-temperature detection unit that detects a temperature of a switching element included in the inverter. The calculation unit includes a brake-torque load-factor determination unit that determines the regenerative-brake-torque load factor according to vehicle speed information as a detection value of a vehicle speed, and a brake-torque load-factor correction unit that corrects a regenerative-brake-torque load factor determined by the brake-torque load-factor determination unit using element temperature information detected by the element-temperature detection unit.

Advantageous Effects of Invention

According to the present invention, it is possible to increase a regenerative brake operation range in the high-speed range without providing additional devices.

DESCRIPTION OF EMBODIMENTS

Exemplary embodiments of an electric vehicle control device and a brake controlling method for an electric vehicle according to the present invention will be explained below in detail with reference to the accompanying drawings. Note that the present invention is not limited to the following embodiments.

First Embodiment

Figure 1:
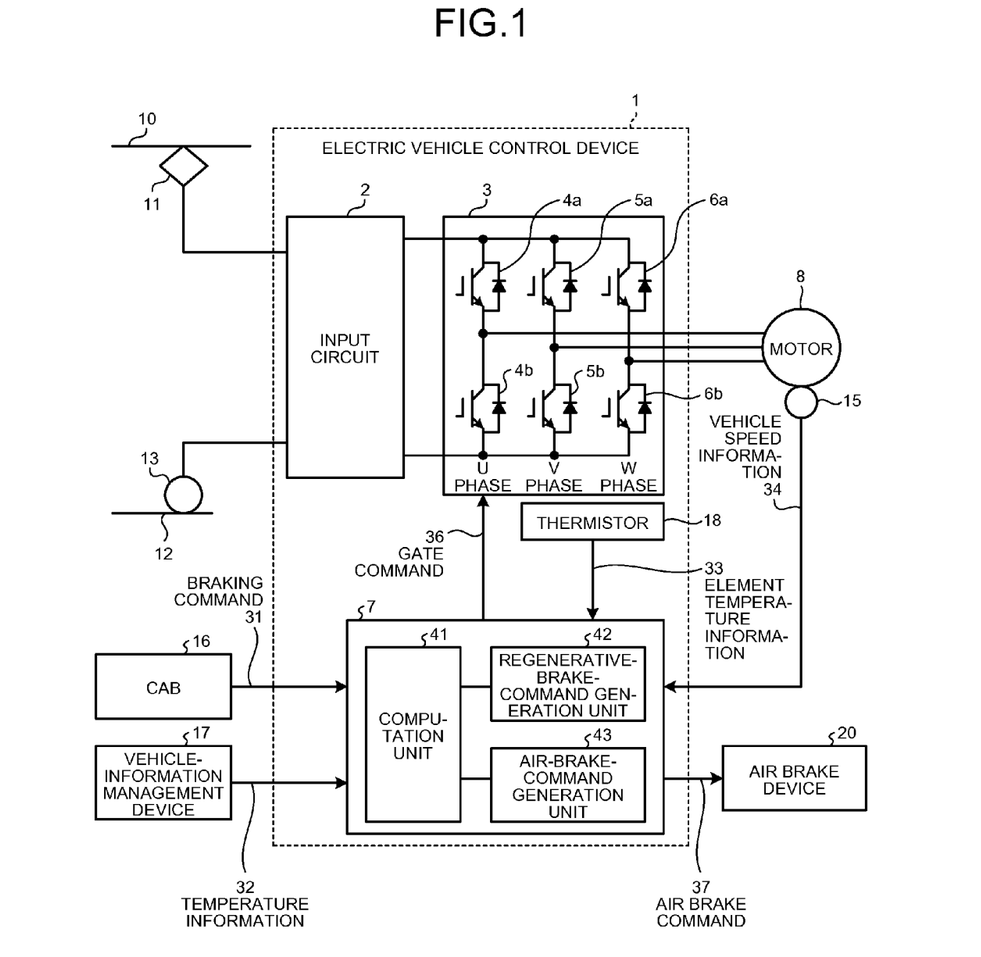
FIG. 1 is a diagram illustrating an example configuration of an electric vehicle control device according to a first embodiment.

FIG. 1 is a diagram illustrating an example configuration of an electric vehicle control device according to a first embodiment. As illustrated in FIG. 1, an electric vehicle control device 1 according to the first embodiment includes an input circuit 2 including at least a switch, a filter capacitor, and a filter reactor; an inverter 3 including switching elements 4a, 5a, 6a, 4b, 5b, and 6b, the inverter 3 being connected to at least one motor 8 that drives the electric vehicle; and a control unit 7 generating and outputting PWM signals U, V, W, X, Y, and Z for executing PWM control on the switching elements 4a, 5a, 6a, 4b, 5b, and 6b, respectively, which are included in the inverter 3. The motor 8, being connected to the inverter 3, is preferably an induction motor or a synchronous motor.

One end of the input circuit 2 is connected to a cable 10 via a pantograph 11, and the other end of the input circuit 2 is connected via a wheel 13 to a rail 12 that is at ground potential. Direct-current power or alternating-current power supplied from the cable 10 is input into the one end of the input circuit 2 via the pantograph 11, and the power (a direct-current voltage) generated at an output terminal of the input circuit 2 is input (applied) to the inverter 3.

The inverter 3 includes legs on which positive-side arms (for example, the switching element 4a in a U phase) constituted by the switching elements 4a, 5a, and 6a and negative-side arms (for example, the switching element 4b in the U phase) constituted by the switching elements 4b, 5b, and 6b are respectively connected to each other in series. That is, in the inverter 3, a three-phase bridge circuit including three pairs of legs (for the U phase, for a V phase, and for a W phase) is constituted. It is preferable to use an IGBT element or an IPM element having an anti-parallel diode incorporated therein as the switching elements 4a, 5a, 6a, 4b, 5b, and 6b.

The control unit 7 includes a calculation unit 41, a regenerative-brake-command generation unit 42, and an air-brake-command generation unit 43. A braking command 31 from a cab 16, temperature information 32 from a vehicle-information management device 17, element temperature information 33 from a thermistor 18 acting as an element-temperature detection unit, and vehicle speed information 34 from a revolution-number detection device 15 acting as a speed detection unit are input into the control unit 7.

The "vehicle-information management device" is a general name for a device that manages train information (such as train operation information, train position information, and ATS (Automatic Train Stop) control information). The present embodiment is described as having the temperature information 32 obtained as the ambient temperature information around the electric vehicle control device and as being held in the vehicle-information management device 17; however, it is also possible to obtain ambient temperature information from devices or sensors other than the vehicle-information management device 17.

While the element temperature information 33 is information indicating the temperatures of the switching elements 4a to 6b included in the inverter 3, it is not always necessary for the element temperature information 33 to be information indicating temperatures of elements themselves, and it can be information related to element temperatures, i.e., it can be any information as long as temperature changes of these elements can be estimated.

FIG. 2(a) and FIG. 2(b) are explanatory diagrams of operations of principal parts of the electric vehicle control device according to the first embodiment. FIG. 2(a) is a diagram illustrating a brake-torque load factor map when the ambient temperature is relatively high, and FIG. 2(b) is a diagram illustrating a brake-torque load factor map when the ambient temperature is relatively low, where the horizontal axis indicates vehicle speed and the vertical axis indicates the regenerative-brake-torque load factor. The regenerative-brake-torque load factor is the ratio of regenerative brake torque with respect to the entire brake torque, which is the sum of the regenerative brake torque and air brake torque.

In FIG. 2(a) and FIG. 2(b), the hatched area on the right side of the curve K1 (K2) indicates an area in which an air brake is used, and the unhatched area on the left side of the curve K1 (K2) indicates an area in which a regenerative brake is used.

At a vehicle speed V1, when the ambient temperature is relatively high, a regenerative brake and an air brake are used in a combined manner or simultaneously; whereas when the ambient temperature is relatively low, only the regenerative brake is used (FIG. 2(a): regenerative-brake-torque load factor=70%, FIG. 2(b): regenerative-brake-torque load factor=100%). Furthermore, at a vehicle speed V2 that is higher than the vehicle speed V1 (V2>V1), even at a speed at which a regenerative brake and an air brake are used at the same time, in a case where the ambient temperature is relatively high and a case where it is relatively low, although the vehicle speeds in these cases are the same, the regenerative-brake-torque load factors in these cases are different to each other (FIG. 2(a): regenerative-brake-torque load factor=20%, FIG. 2(b): regenerative-brake-torque load factor=40%).

This means that, in the electric vehicle control device according to the first embodiment, an operation is applied to change the regenerative-brake-torque load factor depending on whether the ambient temperature is high or low. Specifically, when the ambient temperature becomes lower, the regenerative-brake-torque load factor is controlled such that it becomes larger; and when the ambient temperature becomes higher, the regenerative-brake-torque load factor is controlled such that it becomes smaller.

Figure 3:
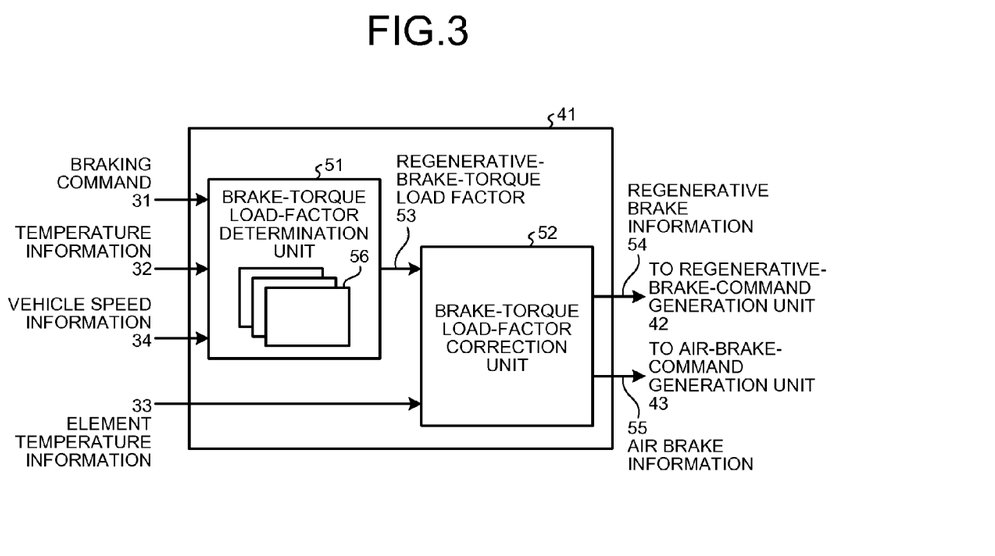
FIG. 3 is a block diagram illustrating an example configuration of a calculation unit according to the first embodiment.

FIG. 3 is a block diagram illustrating an example configuration of the calculation unit 41 illustrated in FIG. 1. The calculation unit 41 is configured to include a brake-torque load-factor determination unit 51 and a brake-torque load-factor correction unit 52.

Figure 4:
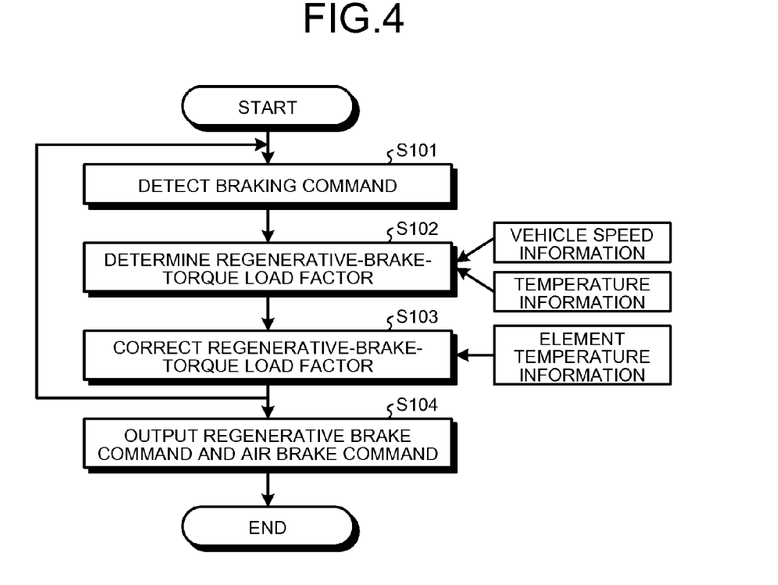
FIG. 4 is a flowchart illustrating the operation of the principal parts of the electric vehicle control device according to the first embodiment.

Next, operations of the calculation unit 41 are described with reference to FIGS. 1 to 4. FIG. 4 is a flowchart illustrating the operation of the principal parts of the electric vehicle control device according to the first embodiment. Specifically, FIG. 4 is a diagram illustrating an operation of the calculation unit 41.

Figure 2:
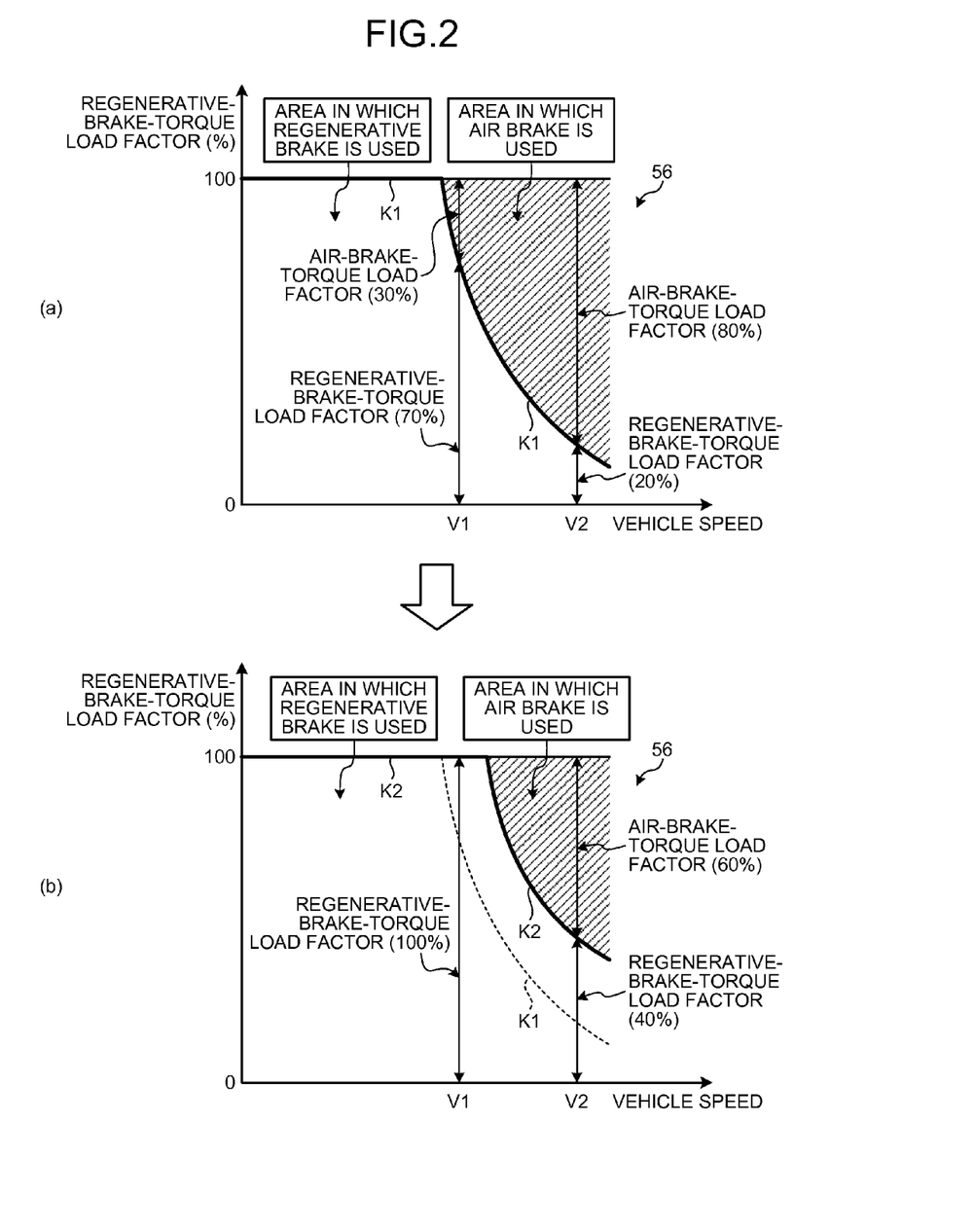
FIG. 2(a) and FIG. 2(b) are explanatory diagrams of operations of principal parts of the electric vehicle control device according to the first embodiment.

The braking command 31 from the cab 16, the temperature information 32 from the vehicle-information management device 17, and the vehicle speed information 34 from the revolution-number detection device 15 are input into the brake-torque load-factor determination unit 51 (see FIG. 3). A brake-torque load factor map 56 (see FIGS. 2 and 3) is provided in the brake-torque load-factor determination unit 51. It is preferable that a plurality of brake-torque load factor maps 56 are provided, the maps being in predetermined step sizes, such as for every 5° C. or every 10° C., so that the maps can be switched depending on the ambient temperature. Note that it is also possible that the brake-torque load factor is obtained by performing a functional calculation on the basis of the ambient temperature and vehicle speed and without using a map such as the brake-torque load factor map 56.

When the brake-torque load-factor determination unit 51 detects the braking command 31 (FIG. 4: Step S101), the brake-torque load-factor determination unit 51 refers to the brake-torque load factor map 56 using the temperature information 32 and the vehicle speed information 34, calculates a regenerative-brake-torque load factor 53, and outputs the calculated regenerative-brake-torque load factor 53 to the brake-torque load-factor correction unit 52 (FIG. 4: Step S102).

In the brake-torque load-factor correction unit 52, the element temperature information 33 from the thermistor 18 is input as well as the regenerative-brake-torque load factor 53 (see FIG. 3). The brake-torque load-factor correction unit 52 corrects the value of the regenerative-brake-torque load factor 53 using the element temperature information 33 (FIG. 4: Step S103).

The processes at Steps S101 to S103 are repeatedly performed with the processing cycle of the calculation unit 41; and calculation values that are changed in each processing cycle are respectively output to the regenerative-brake-command generation unit 42 and the air-brake-command generation unit 43 as regenerative brake information 54 and air brake information 55, respectively.

The regenerative-brake-command generation unit 42 generates a gate command (a PWM signal) 36, by which necessary regenerative brake torque is generated using the regenerative brake information 54, and it controls the switching elements 4a to 6b included in the inverter 3 (Step S104). The air-brake-command generation unit 43 generates an air brake command 37, by which necessary air brake torque is generated using the air brake information 55, and it outputs the air brake command 37 to an air brake device 20 (Step S104).

The processes at Steps S101 to S104 described above are performed each time a braking command is detected.

Described next is an example of a specific process performed by the brake-torque load-factor correction unit 52. For example, it is assumed there is a case where, when an ambient temperature is low, the regenerative-brake-torque load factor 53 determined by the brake-torque load-factor determination unit 51 is increased (i.e., a case where a regenerative-brake-torque load factor is increased). Even in this example, it is assumed that it still is case where for various reasons the element temperature is close to the permissible temperature. In this case, in terms of protection of the elements, it is not preferable to increase regenerative brake torque even if the ambient temperature is low. In this case, for example, the brake-torque load-factor correction unit 52 sets a temperature lower than the permissible temperature as a threshold temperature, and if the element temperature has exceeds the threshold temperature, a process of decreasing the regenerative-brake-torque load factor is performed. As the process of decreasing the regenerative-brake-torque load factor, a method can be adopted to multiply a calculated value of the regenerative-brake-torque load factor by a correction coefficient of less than 1, or to subtract a correction value from a calculated value of the regenerative-brake-torque load factor. Further, the threshold temperature does not need to be a single value, but it can be set to a plurality of values.

Next, specific effects achieved by the electric vehicle control device according to the first embodiment are described.

First, in a conventional electric vehicle control device, only one brake-torque load factor map, such as that illustrated in FIG. 2(a), is referred to in order to determine the regenerative-brake-torque load factor. Therefore, the vehicle speed using a regenerative brake is normally fixed.

In contrast, the electric vehicle control device according to the first embodiment changes, depending on the ambient temperature, the speed range during which regeneration starts. Therefore, it is possible to increase the usage rate of the regenerative brake. This difference is clear if the unhatched areas in FIGS. 2(a) and 2(b) are compared with each other. In this manner, according to the electric vehicle control device of the first embodiment, it is possible to achieve an effect where a regenerative brake operation range in the high-speed range can be increased. Further, because the regenerative brake operation range can be increased, power saving effects also rise.

Furthermore, if the usage rate of the regenerative brake can be increased, it becomes possible to reduce the usage rate of the air brake device. Therefore, according to the electric vehicle control device of the first embodiment, wear of brake shoes can be reduced. As a result, it is also possible to achieve an effect where the lives of brake shoes can be extended.

Further, the electric vehicle control device according to the first embodiment is configured to be capable of correcting a calculated regenerative-brake-torque load factor on the basis of the element temperature information. Therefore, it is also possible to achieve an effect of ensuring the prevention of a state where temperatures of switching elements exceed a permissible temperature.

In the case of an electric vehicle, it is a common practice to provide thereto a resistor brake device that consumes power with a braking resistor. In the operation of a control to increase a regenerative brake operation range in the high-speed range, the chances of raising the cable voltage increase. But, by controlling the operation of the resistor brake device so as not to increase the cable voltage, it is possible to reduce problems associated with the control operation.

Further, in the first embodiment, as indicated by the configuration of the calculation unit 41 illustrated in FIG. 3 and by Steps S102 and S103 in FIG. 4, processes are performed such that the regenerative-brake-torque load factor 53 is calculated using the temperature information 32 and the vehicle speed information 34; and then the value of the regenerative-brake-torque load factor 53 is corrected using the element temperature information 33.

However, it is also possible to have a configuration where the regenerative-brake-torque load factor 53 is calculated using the temperature information 32, the vehicle speed information 34, and the element temperature information 33 at the same time. An example of a specific process will be described here in which, for example, an element temperature is lower than a threshold temperature that is set on the basis of a permissible temperature, a plurality of brake-torque load factor maps corresponding to vehicle speeds as illustrated in FIGS. 2(a) and (b) are held; and control of switching the plurality of brake-torque load factor maps corresponding to the vehicle speeds is executed. Furthermore, when the element temperature is higher than the threshold temperature, it is sufficient if control of referring only to the brake-torque load factor map illustrated in FIG. 2(a) is executed without executing the control of switching the plurality of brake-torque load factor maps.

Second Embodiment

Figure 5:
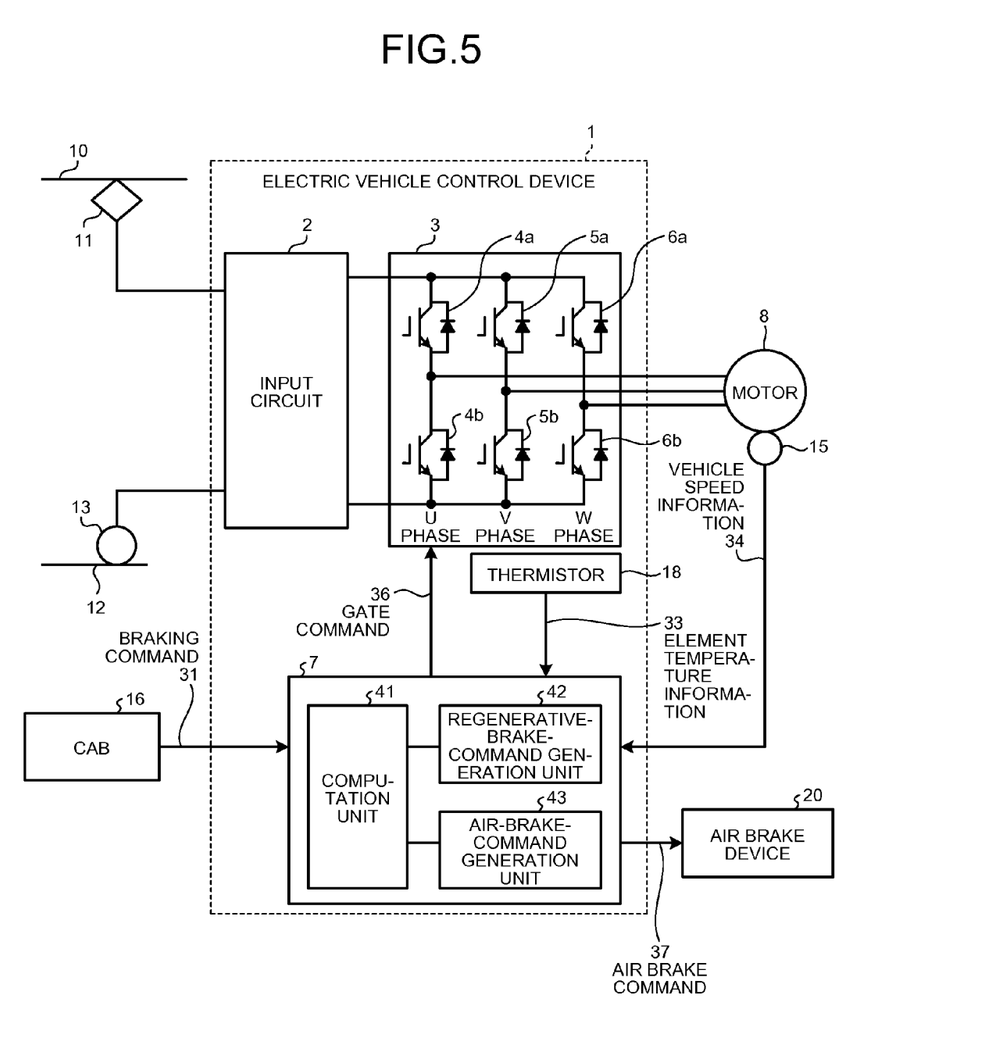
FIG. 5 is a diagram illustrating an example configuration of an electric vehicle control device according to a second embodiment.
Figure 6:
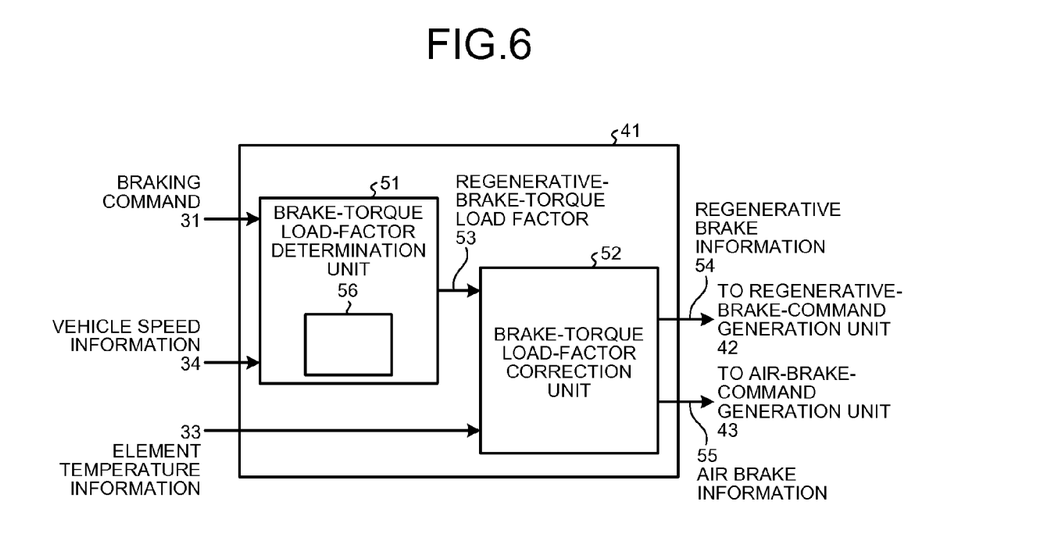
FIG. 6 is a block diagram illustrating an example configuration of a calculation unit according to the second embodiment.

FIG. 5 is a diagram illustrating an example configuration of an electric vehicle control device according to a second embodiment, and FIG. 6 is a block diagram illustrating an example configuration of the calculation unit 41 according to the second embodiment. In the first embodiment, as illustrated in FIGS. 1, 3, and 4, configurations and processes for determining a regenerative-brake-torque load factor using the temperature information 32 have been described. In the second embodiment, as illustrated in FIGS. 5 and 6, a configuration for determining a regenerative-brake-torque load factor without using the temperature information 32 is described. Other configurations of the second embodiment are identical or equivalent to corresponding ones of the first embodiment illustrated in FIGS. 1 and 3, and thus common constituent elements are denoted by like reference signs and redundant explanations thereof are omitted.

In the electric vehicle control device according to the second embodiment, the brake-torque load-factor determination unit 51 provided in the calculation unit 41 determines the regenerative-brake-torque load factor 53 using the vehicle speed information 34, and outputs the determined regenerative-brake-torque load factor 53 to the brake-torque load-factor correction unit 52. The brake-torque load-factor correction unit 52 corrects the value of the regenerative-brake-torque load factor 53 using the element temperature information 33; generates the regenerative brake information 54 and the air brake information 55 using the corrected regenerative-brake-torque load factor 53; and outputs the generated pieces of information.

In the electric vehicle control device according to the second embodiment, the control of changing a speed area in which regeneration is started is not executed; however, the control of correcting the value of the regenerative-brake-torque load factor 53 using the element temperature information 33 is executed, so that the size of the unhatched area on the brake-torque load factor map illustrated in FIG. 2(a) or 2(b) can be made larger as compared with those in conventional techniques. Therefore, according to the electric vehicle control device of the second embodiment, the usage rate of the regenerative brake can be increased more as compared with those in conventional techniques, and thus wearing of brake shoes can be reduced, and it is possible to achieve an effect that the lives of brake shoes can be extended.

Third Embodiment

Figure 7:
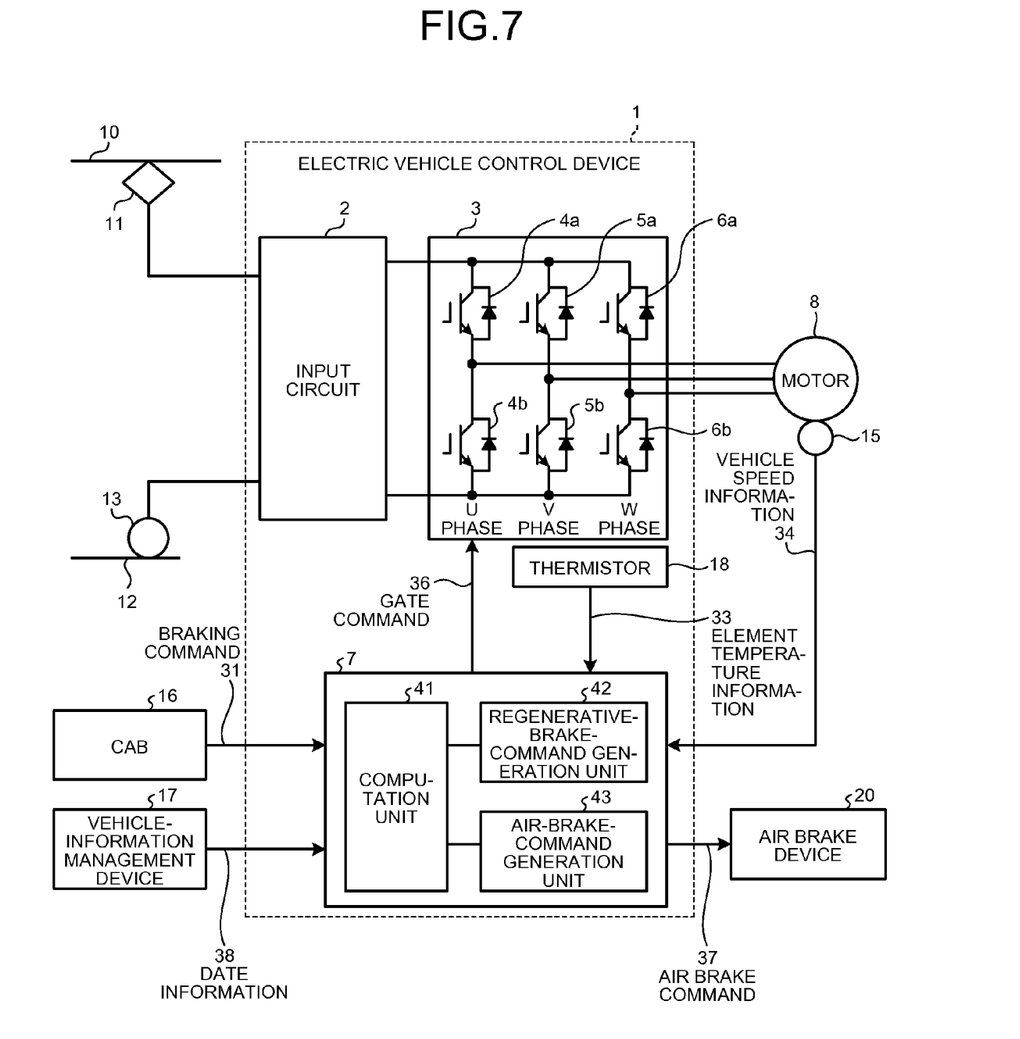
FIG. 7 is a diagram illustrating an example configuration of an electric vehicle control device according to a third embodiment.
Figure 8:
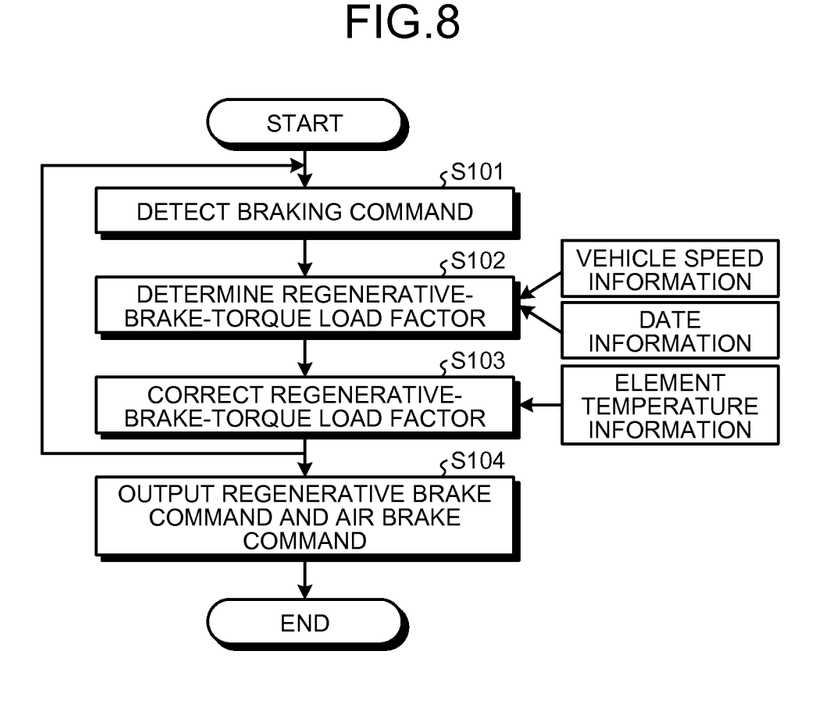
FIG. 8 is a flowchart illustrating the operation of the principal parts of the electric vehicle control device according to the third embodiment.

FIG. 7 is a diagram illustrating an example configuration of an electric vehicle control device according to a third embodiment, and FIG. 8 is a flowchart illustrating an operation of principal parts of the electric vehicle control device according to the third embodiment. In the first embodiment, as illustrated in FIGS. 1, 3, and 4, configurations and processes of determining a regenerative-brake-torque load factor using the temperature information 32 have been described. In the third embodiment, as illustrated in FIGS. 7 and 8, a configuration of determining a regenerative-brake-torque load factor using date information 38 instead of the temperature information 32 is described. Other configurations of the third embodiment are identical or equivalent to corresponding ones of the first embodiment illustrated in FIGS. 1 and 4, and thus common constituent elements are denoted by the same reference signs and redundant explanations thereof are omitted.

The date information 38 can be any information as long as it can be related to the ambient temperature described in the first embodiment by the usage thereof. That is, the date information 38 is not limited to information specifying the date itself, such as what day of what month; and it can be information specifying the month or specifying the season. Depending on the region where trains using the electric vehicle control device are operated, the national land is vast or seasonal temperature variations are fierce, and thus it is preferable for the information to have year-long temperature information in the corresponding operating region.

When the control unit 7 has the date information 38 or other information related to the date, it is needless to mention that it is no need of acquiring the date information 38 from the vehicle speed information 34.

According to the electric vehicle control device of the third embodiment, because the control of increasing the usage rate of the regenerative brake can be executed using date information instead of temperature information, even when temperature information cannot be obtained, it is possible to achieve an effect that control can be executed even when temperature information cannot be obtained.

In the first to third embodiments described above, the switching elements 4a to 6b can be formed of a general semiconductor such as silicon or GaAs, and can be also formed of a wide bandgap semiconductor such as SiC, a gallium nitride-based material, or diamond.

As an example, it can be there is a case where the switching elements 4a to 6b are formed of SiC. When SiC is used, a loss caused in this case can be made less than that in a case where Si is used, as these cases are compared on an assumption that the same operating current is used. Therefore, in the case of using SiC, the heat generation amount with respect to the same operating current can be more decreased than that in the case of using Si. Further, because the heat resistance of SiC is higher than that of Si, the permissible temperature of SiC is higher than that of Si. Therefore, when the switching elements 4a to 6b are formed of a wide bandgap semiconductor, the usage rate of a regenerative brake can be further increased.

Configurations described in the first to third embodiments are only examples of the configuration of the present invention, and these configurations can be combined with other well-known techniques. It is needless to mention that the present invention can be configured while modifying it without departing from the scope of the invention, such as omitting a part of these configurations.

INDUSTRIAL APPLICABILITY

As described above, the present invention is useful as an electric vehicle control device that can increase regenerative brake operation ranges in a high-speed range without providing additional devices.

REFERENCE SIGNS LIST 1 electric vehicle control device, 2 input circuit, 3 inverter, 4a, 5a, 6a, 4b, 5b, 6b switching element, 7 control unit, 8 motor, 10 cable, 11 pantograph, 12 rail, 13 wheel, 15 revolution-number detection device (speed detection unit), 16 cab, 17 vehicle-information management device, 18 thermistor (element-temperature detection unit), 20 air brake device, 41 calculation unit, 42 regenerative-brake-command generation unit, 43 air-brake-command generation unit, 51 brake-torque load-factor determination unit, 52 brake-torque load-factor correction unit.

The invention claimed is:

1. An electric vehicle control device comprising:
an inverter to drive a motor;
a calculation unit to calculate a regenerative-brake-torque load factor when a braking command is detected, wherein the reqenerative-brake-torque load factor is a ratio of a regenerative brake torque with respect to a total brake torque; and
an element-temperature detection unit to detect a temperature of a switching element included in the inverter, wherein
the calculation unit includes
a brake-torque load-factor determination unit to determine the regenerative-brake-torque load factor according to vehicle speed information as a detection value of a vehicle speed, and
a brake-torque load-factor correction unit to correct a regenerative-brake-torque load factor determined by the brake-torque load-factor determination unit using element temperature information detected by the element-temperature detection unit.

2. The electric vehicle control device according to claim 1, wherein
ambient temperature information is input into the calculation unit, and
the brake-torque load-factor determination unit determines the regenerative-brake-torque load factor using the vehicle speed information and the ambient temperature information.

3. The electric vehicle control device according to claim 1, wherein
date information is input into the calculation unit, and
the brake-torque load-factor determination unit determines the regenerative-brake-torque load factor using the vehicle speed information and the date information.

4. A brake controlling method for an electric vehicle that simultaneously uses an air brake and a regenerative brake, the brake controlling method comprising:
calculating a regenerative-brake-torque load factor, which is a ratio of regenerative brake torque with respect to entire brake torque,
the calculating being performed on the basis of speed information on the electric vehicle, ambient temperature information of the electric vehicle, and temperature information of switching elements included in an inverter that drives a motor of the electric vehicle; and generating a regenerative brake command and an air brake command on the basis of a calculated regenerative-brake-torque load factor.

5. A brake controlling method for an electric vehicle that simultaneously uses an air brake and a regenerative brake, the method comprising:

a first step of determining, on the basis of speed information and ambient temperature information on the electric vehicle, a regenerative-brake-torque load factor, which is a ratio of regenerative brake torque with respect to entire brake torque;

a second step of correcting, on the basis of temperature information of a switching element included in an inverter that drives a motor of the electric vehicle, the regenerative-brake-torque load factor being determined at the first step; and a step of generating a regenerative brake command and an air brake command on the basis of the regenerative-brake-torque load factor that is corrected at the second step.

6. The electric vehicle control device according to claim 1, further comprising:

a regenerative-brake-command generation unit to generate a regenerative brake command on the basis of the regenerative brake-torque load factor; and an air-brake-command regeneration unit to generate an air brake command on the basis of the regenerative-brake-torque load factor.

* * * * *